United States Patent [19]
Jacob

[11] 4,201,451
[45] May 6, 1980

[54] WIDE ANGLED REAR VIEW MIRROR APPARATUS

[75] Inventor: Keith D. Jacob, Ann Arbor, Mich.

[73] Assignee: Donald F. Hassinger, Ann Arbor, Mich.

[21] Appl. No.: 896,895

[22] Filed: Apr. 17, 1978

Related U.S. Application Data

[63] Continuation-in-part of Ser. No. 846,835, Oct. 31, 1977, abandoned, and a continuation-in-part of Ser. No. 720,150, Sep. 3, 1976, abandoned.

[51] Int. Cl.² .......................... G02B 5/08; G02F 1/13
[52] U.S. Cl. .................................. 350/278; 350/303; 350/331 R; 340/98
[58] Field of Search ............... 350/303, 304, 302, 307, 350/277, 278, 279, 283, 288, 338, 331; 340/98

[56] References Cited

U.S. PATENT DOCUMENTS

| | | | |
|---|---|---|---|
| 2,514,989 | 7/1950 | Buren | 350/303 |
| 3,151,207 | 9/1964 | Moller | 350/303 |
| 3,519,336 | 7/1970 | Russell | 350/307 |
| 3,614,210 | 10/1971 | Caplan | 350/278 |
| 3,862,798 | 1/1975 | Hopkins | 350/278 |
| 4,031,772 | 6/1977 | DeCostri | 350/280 |
| 4,088,398 | 5/1978 | Zoursel | 350/280 |

*Primary Examiner*—Jon W. Henry
*Attorney, Agent, or Firm*—Olsen and Stephenson

[57] ABSTRACT

An arrangement of rear view mirrors for a motor vehicle including a pair of mirror assemblies positioned to extend the areas of vision to the right and left rear sides of the motor vehicle. Each mirror assembly is normally nonreflective and includes a liquid crystal solution which covers a mirrored surface and which is responsive to the presence or absence of an electrical charge to render the mirror assembly reflective. Each angled mirror assembly is activated by operation of the turn signal system to provide the operator of the vehicle with an extended area of view to the rear side of the vehicle that corresponds to the direction in which the vehicle is to travel.

16 Claims, 16 Drawing Figures

U.S. Patent  May 6, 1980  Sheet 1 of 3  4,201,451
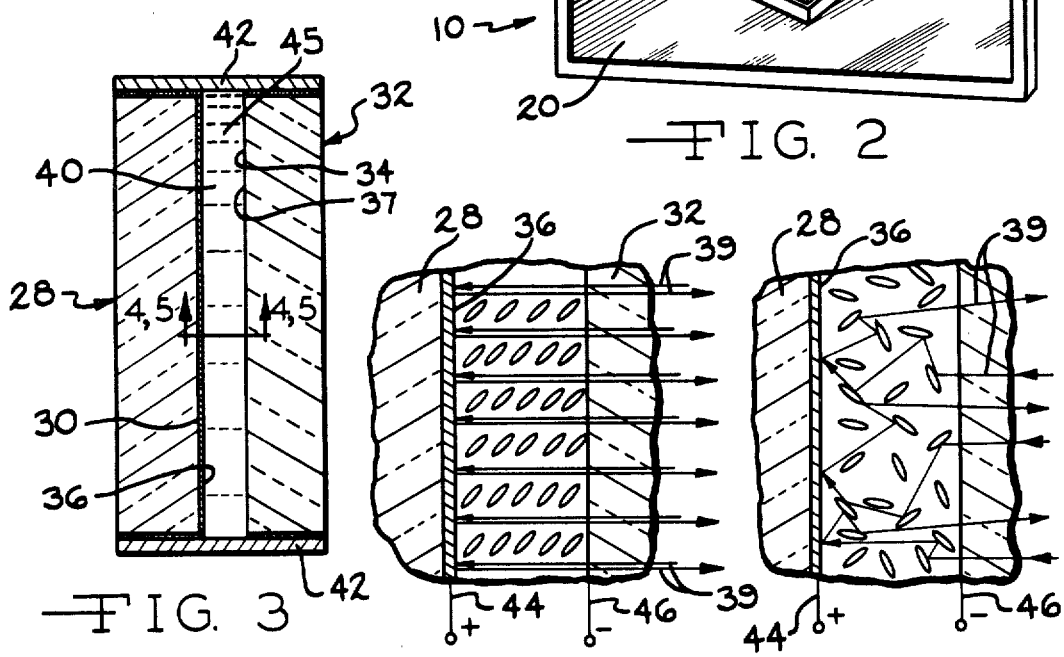

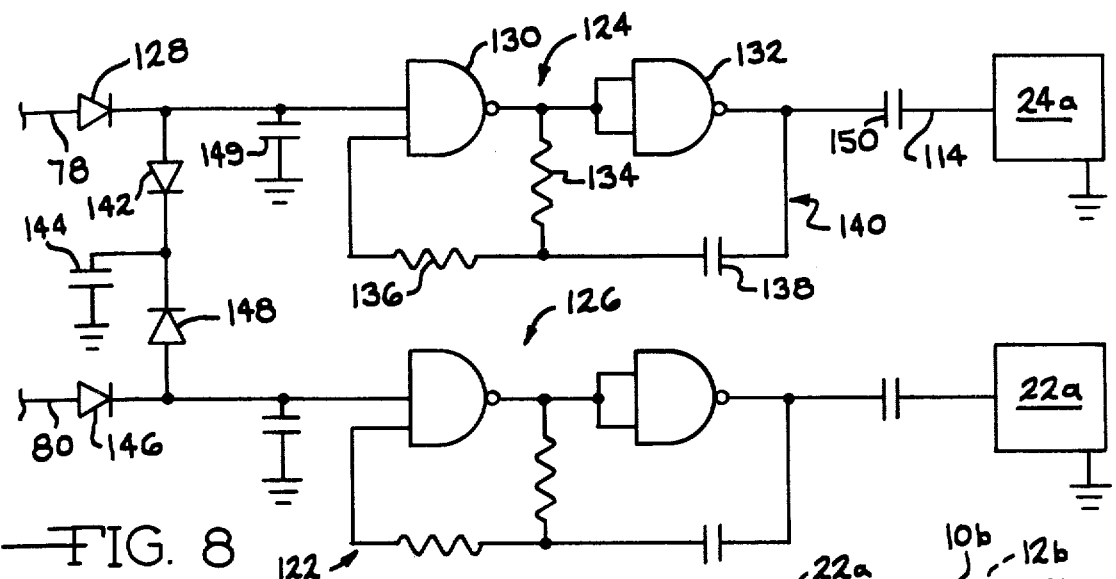
FIG. 8
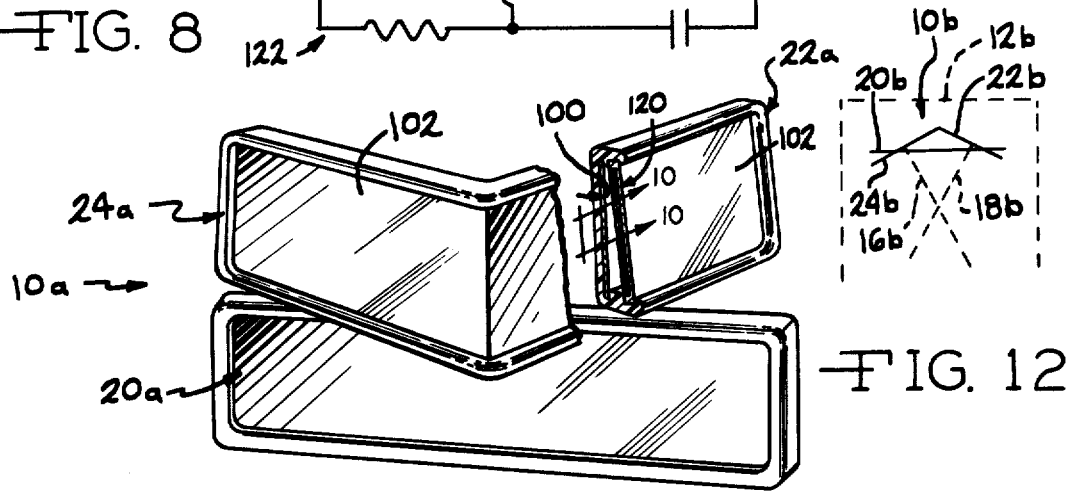
FIG. 9
FIG. 12
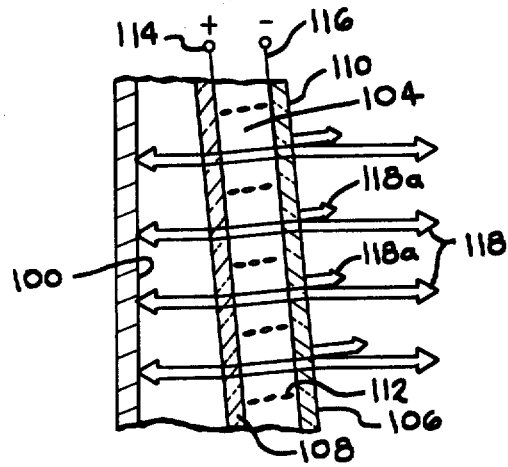
FIG. 10
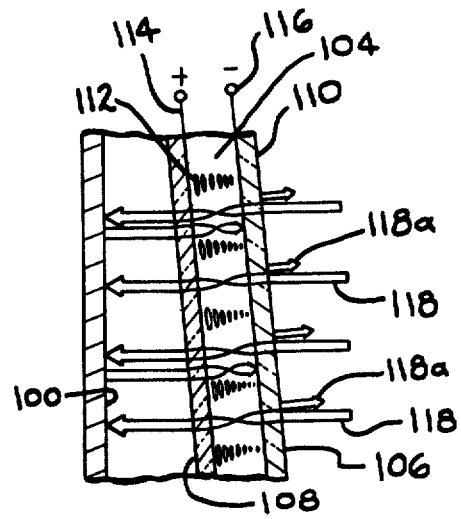
FIG. 11

WIDE ANGLED REAR VIEW MIRROR APPARATUS

REFERENCE TO RELATED APPLICATION

This application is a continuation-in-part of pending application Ser. No. 846,835, filed Oct. 31, 1977, now abandoned, and application Ser. No. 720,150, filed Sept. 3, 1976, now abandoned.

BACKGROUND OF THE INVENTION

The present invention relates generally to rear view mirror apparatus for motor vehicles, and more specifically, to a rear view system for extending the areas of vision to the left and right rear sides of the vehicle.

In U.S. Pat. No. 4,027,953, issued to the assignee of this application, an adjustable rear view mirror is disclosed which includes a mirror that is movable from a normally centered position to positions angled to the left and right of the centered position. This system thus provides the operator with the ability to view on either side of the vehicle; however, since a single mirror is used it can only provide a view of one area at a time.

The likelihood of a collision is minimized if the operator has a panoramic view to the rear and rear sides of the vehicle so that he can monitor the traffic and potential hazards in those areas. An arrangement of mirrors to accomplish this requires that some of the mirrors be positioned at angles that are more pronounced than the angle of the rear view mirror. Since the angled mirrors reflect images from the rear sides of the vehicle, the images of stationary objects such as trees and parked vehicles appear to flash across the angled mirror surfaces. Thus, when the operator looks in the general direction of the angled mirrors he may become distracted or even confused by the images moving across the angled mirrors.

There is a need, therefore, for a rear view mirror arrangement in a vehicle in which selected mirrors reflect images from the left and right rear sides of the vehicle, and in which the mirrors are normally nonreflective, being selectively rendered reflective by the operator.

SUMMARY OF THE INVENTION

In accordance with the present invention, a rear view mirror arrangement is provided for installation on a vehicle to provide the operator with a panoramic view to the rear and the rear sides of the vehicle. The rear view mirror arrangement includes a pair of angled mirror assemblies, one mirror assembly being positioned to reflect images from the left rear side of the vehicle and the other mirror assembly being positioned to reflect images from the right rear side of the vehicle.

Each angled mirror assembly includes a mirrored surface that is covered by a nematic liquid crystal solution that is encapsulated within the assembly. The liquid crystal solution functions to render the mirror assemblies either reflective or nonreflective and is selectively connected to a power source to orient the molecules in the solution in such a way to pass or block incident light rays. Consequently, each mirror assembly can be constructed to be reflective when current is supplied to the liquid crystal solution or reflective in the absence of current.

The angled mirrors are normally nonreflective having an opaque or frosted appearance. A control operated by the driver can be actuated to render a selected one of the angled mirrors reflective. In one form of the invention, the angled mirrors are operatively associated with the turn signal system whereby movement of the turn signal lever to activate the right or left turn signal renders the corresponding angled mirror reflective. For example, activation of the right turn signal would cause the angled mirror assembly which provides a view to the right rear of the vehicle to become reflective. The operator can thus view the area to the right rear side before turning the vehicle to the right, either to change lanes or to make a right turn.

In one form of the invention, the angled mirror assemblies are mounted on a housing along with a rear view mirror. The housing is adjustably mounted on the vehicle to accommodate the operator. The rear view mirror and angled mirror assemblies can be fixed in the proper position on the housing or they can be adjustably mounted thereon. In another form of the invention the angled mirror assemblies are mounted on a separate housing that does not support the rear view mirror. Other arrangements of mounting the mirrors are also disclosed.

Each angled mirror assembly is equipped with an outer transparent member for retaining the liquid crystal solution in the assembly. The exposed surface of this member is inclined to face in a generally upwardly direction. Consequently, any first surface reflections off the face of the transparent member will come from the ceiling of the passenger compartment. Otherwise, first surface reflections would emanate from the right and left rear sides of the vehicle creating distractions for the operator.

It is therefore the general object of this invention to provide a rear view mirror arrangement for a motor vehicle that has angled mirrors for extending the areas of vision to the left and right rear sides of the vehicle.

It is a further object of this invention to provide apparatus for rendering selected mirrors operative and inoperative to produce reflections.

Further objects, features and advantages of the present invention will become apparent from a consideration of the following description when taken in connection with the appended claims and the accompanying drawing in which:

FIG. 1 is a top plan view showing the rear view mirror apparatus of the present invention located in a motor vehicle;

FIG. 2 is a perspective view of the mirror arrangement of the present invention;

FIG. 3 is a sectional view of one mirror assembly taken substantially from line 3—3 in FIG. 2;

Figure 13:
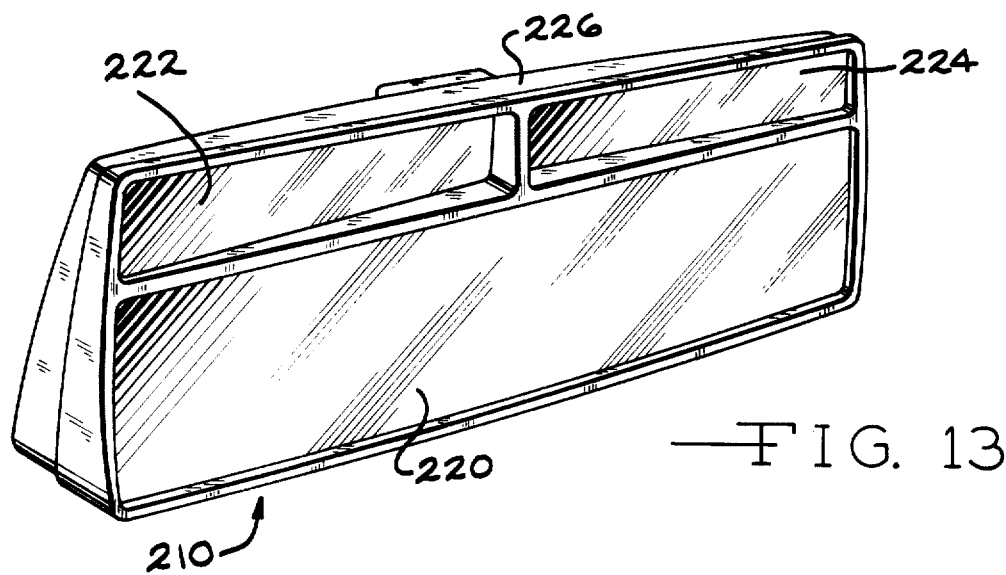
Figure 14:
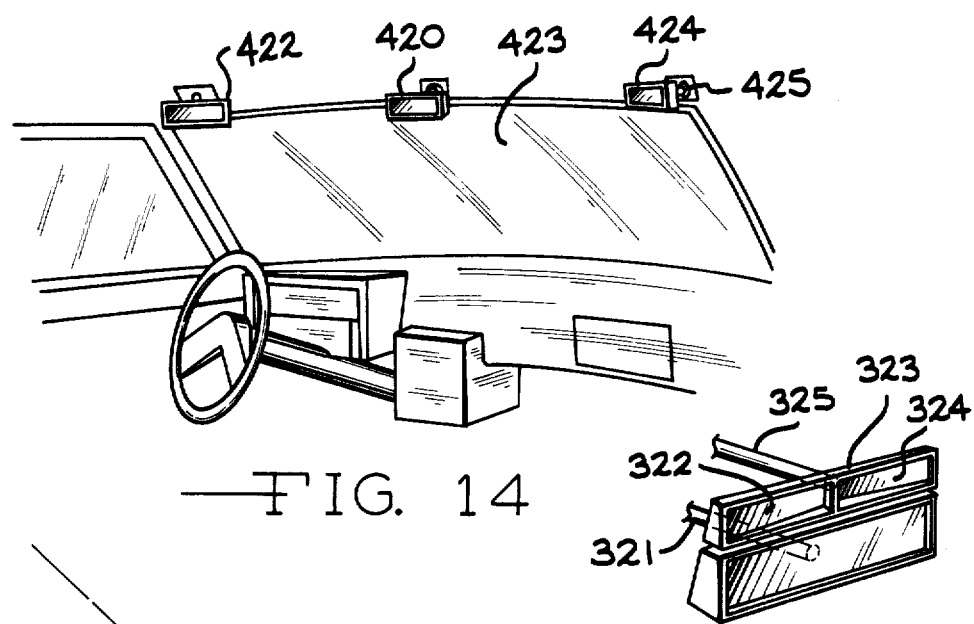
Figure 16:
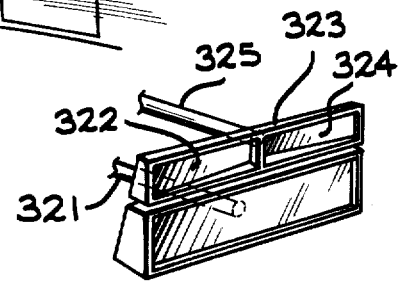
Figure 15:
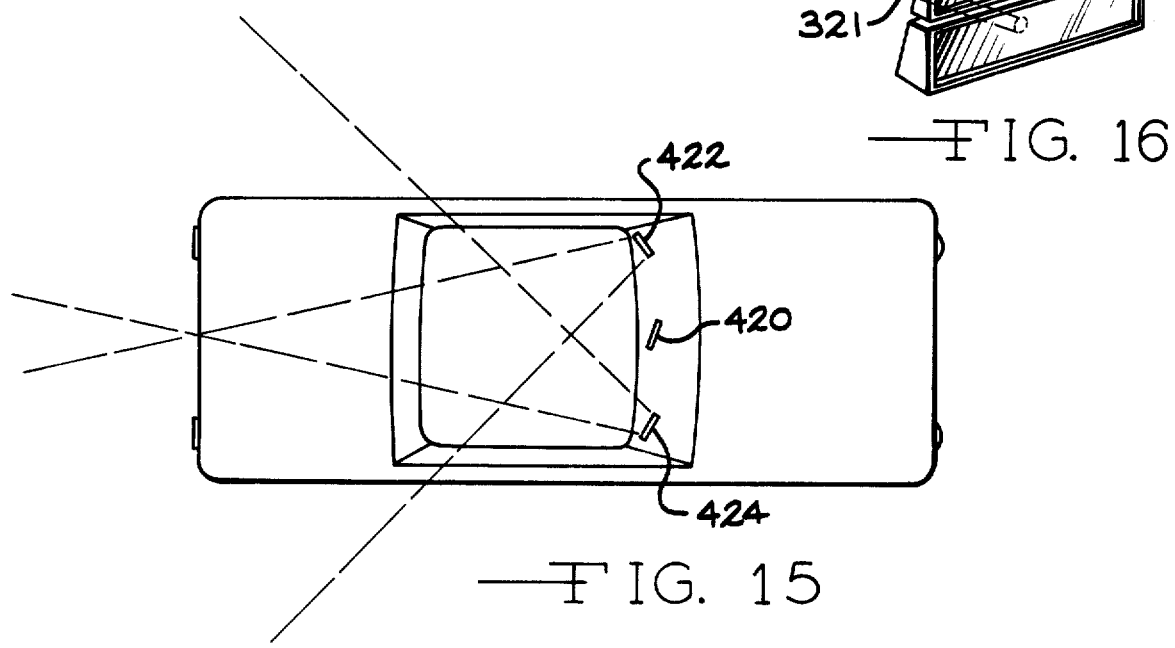

FIGS. 4 and 5 are sectional views of the mirror assembly taken substantially from lines 4—4 and 5—5 in FIG. 3;

FIG. 6 is a schematic diagram of control circuitry of the present invention incorporated in the turn signal system of a motor vehicle;

FIG. 7 is a detailed schematic diagram of the control circuitry shown in FIG. 6;

FIG. 8 is a schematic diagram of another control circuit connected with the turn signal system and the left and right angled mirror assemblies of the present invention;

FIG. 9 is a perspective view of a modified form of the rear view mirror apparatus of the present invention;

FIGS. 10 and 11 are fragmentary sectional views of the angled mirror assembly taken substantially from line 10—10 in FIG. 9;

FIG. 12 is a diagrammatic view of a modified form of the mirror apparatus of the present invention;

FIG. 13 is a perspective view of another modified form of the rear view mirror apparatus of the present invention;

FIGS. 14 and 15 show another modified form of the rear view mirror apparatus mounted on a vehicle; and FIG. 16 shows another modified form of the rear view mirror apparatus of the present invention.

The rear view mirror apparatus includes mirror assemblies, each consisting of a mirror surface that is covered by a nematic liquid crystal solution which is encapsulated within the assembly. The liquid crystal solution is responsive to a voltage signal and depending on the type of solution selected and the construction of the mirror assembly, the assembly can become reflective in either the presence or absence of a voltage signal. The light rays impinging on the liquid crystal mirror assemblies are diffused either by rotation or by dynamic scattering depending on the particular type of nematic liquid crystal solution being employed.

The mirror assemblies are suitably located in the passenger compartment of the vehicle to enlarge the areas of vision to the left and right rear sides of the vehicle. The mirror assemblies are operatively associated with the vehicle's turn signal system so that actuation of the turn signal system by moving the turn signal lever to the appropriate position provides for the associated mirror assembly to become reflective to provide the vehicle operator with a view to the selected rear side of the vehicle in the direction in which the vehicle is to be turned. Deactivation of the turn signal system causes the mirror assembly to become nonreflective. Consequently, the operator is not bothered by images moving across the angled mirrors as the vehicle is proceeding on a thoroughfare.

The rear view mirror apparatus 10 comprises a normally centered mirror 20 and angled right and left mirror assemblies 22 and 24, respectively. The mirrors are adjustably mounted on a mounting member 26 which is in turn secured to the windshield or the windshield frame of the motor vehicle 12. The mirrors 20, 22, and 24 are adjustably mounted on the mounting member 26 for movement relative to each other and relative to the vehicle operator. This arrangement enables the vehicle operator to adjustably position each mirror relative to the lines of sight 14, 16, and 18 shown in FIG. 1.

The mirror assemblies 22 and 24 remain inoperative during the forward movement of the motor vehicle 12, during which time the mirrors 22 and 24 have a frosted appearance as a result of the incident light radiation being diffused to prevent the reflection of images therefrom. The present invention enables the vehicle operator to selectively render each mirror 22 and 24 operative to reflect images on the right rear side and the left rear side of the vehicle 12, respectively. Thus, as the vehicle 12 is progressing down the road, the operator will not be distracted by any images moving across the angled mirrors 22 and 24.

Each mirror assembly 22 and 24 (FIG. 3) comprises a pair of opposed glass plates 28 and 32. The glass plate 28 has an inner surface 30 and the glass plate 32 has an inner surface 34. The inner surface 30 is coated with a conductively reflective material 36 such as silver and the opposing adjacent surface 34 is coated with a thin transparent conductive material 37 such as a few microns of gold. The glass plates 28 and 32 are spaced apart a distance sufficient to form a retaining space 40 when the seals 42 are secured along the edges of the glass plates 28 and 32. A conductor 44 is connected to the conductive reflective surface 36 and the conductor 46 is connected to the conductive surface 37.

The retaining space 40 is filled with a conductive liquid crystal solution 45 that is transparent when no electrical energy is applied therethrough. When electrical power is applied, the solution becomes cloudy thereby preventing reflection of images from the mirror surface 36 by diffusing the incident light radiation to and from the mirror surface 36.

FIGS. 4 and 5 show more clearly the characteristics of the liquid crystal solution 45. This liquid crystal solution preferably consists of a nematic solution which is clear in the absence of an electric field and when an electric field is induced, the liquid gives a visual appearance of a frosted, cloudy solution. FIG. 4 shows the relative positions of the molecules within the solution in the absence of an electric field. As can be seen, these molecules are oriented in a regular alignment enabling incident light radiation, represented by the arrows 39, to pass through the solution and be reflected off the conductive mirror surface 36. When an electric field is induced in the nematic solution, as shown in FIG. 5, the molecules scatter which in turn scatter the incident light radiation 39 thereby preventing the mirror surface 36 from reflecting images.

In the present invention, the mirror assemblies 22 and 24 are rendered operative when control means in the form of the turn signal system is activated. In this manner, the driver is not distracted by the images from the left rear and right rear side of the vehicle when he glances at the mirror 20 as he is progressing down the road. Operational control of the mirror assemblies 22 and 24 is incorporated into the turn signal system 50 of the motor vehicle so that whenever the vehicle operator activates either the left hand or right hand turn signal, the corresponding mirror 24 or 22 becomes operational to reflect images and afford the operator an enlarged area of view to the particular rear side of the vehicle 12.

The control circuitry 48 for the mirror assemblies 22 and 24 is connected to the turn signal system 50 which is powered by the vehicle battery 52. The battery 52 has its positive terminal connected by conductor 54 to control circuitry 48. The positive terminal of the battery 52 is also connected by conductors 54 and 56 to a flasher control device 58 which controls the on and off flashing of the signals when the system is activated. The flasher control 58 is connected to a three position switch 60 by the conductor 62. The switch 60 has an actuating arm 64 controlled by the turn lever and spaced apart contacts 66 and 68. A left hand signal 70 is connected by conductor 72 to the contact 66 and a right hand signal 74 is connected by a conductor 76 to the contact 68. Lines 78 and 80 connect the signals 70 and 74, respectively, to the control circuitry 48. When, for example, the left hand signal 70 is activated, the control circuitry 48 is activated to remove electrical energy from the corresponding mirror 24 thereby rendering the nematic solution transparent to enable images to be reflected off the mirror surface 36.

Only that portion of the circuitry 48 relating to the left hand mirror assembly 24 is shown and described as this circuitry is identical to the circuitry controlling the right hand mirror 22. Conductor 78 which is connected to the signal 70 forms an input to an inverter 86. A diode D1, a capacitor C1, and a resistor R1 are connected to the line 78 between the signal 70 and the inverter 86. The output of the inverter 86 forms one input through line 88 to a Nand Gate 90, the input of which is applied to another inverter 94 through conductor 92. The output of the inverter 94 is transmitted through a capacitor C3 to the left hand mirror 24 through the conductors 44 and 46. The output of the inverter 94 also forms a second input to the Nand Gate 90 through line 96. Capacitor C2 and a resistor R3 are located respectively in the line 96 between the output of the inverter 94 and the second input of the Nand Gate 90. A resistor R2 is connected from line 92 to line 96 between the capacitor C2 and the resistor R3. The Nand Gate 90 and the inverter 94 form an oscillator 95 which provides a square wave pulse signal to the nematic solution 45 in the mirror 24 to provide for dynamic scattering of the molecules therein to diffuse incident light radiation.

When the turn indicator switch 60 is in the off position or open, as shown in FIG. 6, a low level output is applied to the capacitor C1 which in turn applies this low level output to the inverter 86. The low level output is inverted by the inverter 86 and a high output is applied through line 88 to the first input of the Nand Gate 90, allowing the oscillator 95 to develop an output through capacitor C3 at a frequency determined by the resistor R2 and the capacitor C2. The square wave output of the oscillator 95 is coupled to the nematic liquid crystal solution 45 in the mirror 24 by the capacitor C3, exciting the molecules in the nematic liquid causing diffusion of incident light radiation, thereby giving the mirror 24 a frosted appearance and rendering it inoperative.

When the turn signal 70 has been activated by the closing of switch arm 64 against contact 66, the turn signal voltage is pulsed through line 78, the diode D1 to charge capacitor C1 to a voltage level of 12 volts in most conventional vehicles. The capacitor C1 discharges slowly through the resistor R1. As long as the turn signal 70 is pulsing the voltage on C1 remains above the threshold level of the inverter 86 causing its output to be at a low level state. As a result, the output of the Nand Gate 90 is high causing the output of the inverter 92 to be at a low level state. Thus, the output of the inverter 86 remains low preventing the oscillator 95 from being activated and, as a result, the nematic solution 45 remains transparent as long as a turn signal is pulsing enabling the operator to view the areas to the rear and left rear side of the vehicle 12.

In another form of the invention, illustrated in FIGS. 9-11, a rear view mirror apparatus 10a is provided having a center mirror assembly 20a, an angled right mirror assembly 22a, and an angled left mirror assembly 24a. The mounting and relative positions of the mirror assemblies 20a, 22a, and 24a in this form of the invention are identical to that of the previously described mirror apparatus 10. The mirror assemblies 22a and 24a, however, differ in construction and operation from the mirror assemblies 22 and 24 of the apparatus 10.

Each mirror assembly 22a and 24a includes a mirror 100 and a liquid crystal unit 102 mounted on the assembly in covering relation with the mirror 100. It is seen in FIGS. 10 and 11 that each liquid crystal unit 102 consists of a single layer of liquid crystal solution 104 sandwiched between a pair of spaced transparent members 106 and 108 which may take the form of glass plates, for instance. The transparent member 106 has a generally flat exposed surface 110 and the member 106 forms a linear polarizer. If desirable, a separate linear polarizer can be mounted to cover the exposed surface 110 of an unpolarized transparent member 106 and achieve the same results as will hereinafter be described.

The liquid crystal unit 102 employed in this form of the invention is commonly referred to in the art as a "field effect" liquid crystal unit, so called because of the manner in which the liquid crystal unit passes and blocks incident light rays. The liquid crystal solution 104 has molecules 112 that are arranged in a plurality of helical stacks when no electrical power is supplied to the solution 104 through leads 114 and 116 as shown in FIG. 11. In this condition, the incident light rays 118 are filtered by the polarizer 106 and, because of the selected thickness of the solution, are rotated 45° by the liquid crystal solution 104. After being reflected from the mirror 100, the light rays are again rotated another 45° so as to be oriented to be absorbed by the polarizer 106. The mirror assembly is thus non-reflective.

When electrical power is applied to the liquid crystal solution 104 through the leads 114 and 116, the molecules 112 are rotated to a position perpendicular to the members 106 and 108, as shown in FIG. 10. In this instance, the light rays 118 are filtered by the polarizer 106, but are not rotated by the liquid crystal solution 104 so that the filtered reflected light from the mirror 100 will pass through the liquid crystal unit 102. It can be appreciated that a liquid crystal unit 102 can be constructed with various polarizer arrangements wherein the unite 102 will block the reflections from the mirror 100 when electrical power is supplied to the solution 104 and will pass light in the absence of any electrical power, the reverse of that shown in FIGS. 10 and 11.

The liquid crystal units 102 are mounted on the assemblies 22a and 24a so that the exposed surface 110 of each unit 102 defines an angle 120 with the surface of its associated mirror 100. It is seen in FIGS. 9-11 that the surface 110 is angled so that it faces in a generally upwardly direction. Orienting the unit 102 to angle the exposed surface 110 upwardly serves to eliminate any distractions to the operator that may occur when images are reflected from the exposed surface 110.

Even if the unit 102 is in a state of blocking the reflections from the mirror 100, the exposed surface 110 will continue to reflect a detectable amount of light. Thus, by inclining the exposed surface 110 upwardly, the exposed surface 110 will reflect an image of the ceiling of the passenger compartment which will not distract the operator.

It can be seen in FIGS. 10 and 11 that when the horizontally directed incident light rays 118 strike the exposed surface 110, a portion of the light will be reflected from the exposed surface 110 in the direction of the arrows 118a. Conversely, any reflections from the exposed surface 110 that are detected by the operator will, in most instances, propogate in a direction opposite from the direction indicated by the arrows 118a; that is, from the ceiling of the passanger compartment. It has been found that the angle in radious between the exposed surface 110 and the surface of the mirror is to be no greater than the index of refraction of the transparent member 106 to enable proper functioning of the liquid crystal unit 102.

The control circuitry 122 shown in FIG. 8 operates to control the operation of the mirror assemblies 22a and 24a whereby each mirror assembly becomes reflective when electrical power is supplied to the liquid crystal solution 104 in the unit 102 covering its associated mirror 100. Assume that the control circuitry 122 replaces the control circuit 48 shown in FIG. 6. The left mirror assembly 24a is connected through the circuit segment 124 to the line 78 and the right mirror assembly 22a is connected through a circuit segment 126. The circuit segments 124 and 126 are identical so that only the circuit segment 124 will be described in detail.

The circuit 124 includes a diode 128 having its anode connected to the line 78 and its cathode connected to an input of a Nand Gate 130 which together with a Nand Gate 132, resistors 134 and 136 and a capacitor 138 form an astable multivibrator or square wave oscillator 140. The diode 128 is also connected through a diode 142 to a capacitor 144 which is also connected to the line 80 through the diodes 146 and 148. The diodes 142 and 148 are biased in opposite directions so that when one of the oscillators is activated, the other oscillator remains inactive. The diode 128 is also connected to a capacitor 149.

The output of the oscillator 140 is connected through a capacitor 150 and the lead 114 to the liquid crystal solution 104 in the mirror assembly 24a. When the left turn signal is operating a pulsing direct current signal is applied to the circuit 124; the capacitors 144 and 149 are charged through the diode 128 to turn on the oscillator 140. When the oscillator 140 is operating, electrical power is supplied through the capacitor 150 to the liquid crystal solution 104 to render the mirror assembly 24a reflective. When the left turn signal is turned off, the mirror assembly 24a will remain reflective until the capacitor 144 discharges through the oscillator 140 and the mirror assembly 24a at which time the mirror assembly becomes non-reflective.

The rear view mirror apparatus can be constructed, as seen generally at 10b, in FIG. 12, of a centered mirror 20b and angled right and left mirror assemblies 22b and 24b, respectively. This arrangement differs from the arrangements illustrated in FIGS. 2 and 9 in that the mirror assemblies 22b and 24b are angularly arranged so as to form an angle between their reflective portions that is less than 180° whereas the angle formed between the reflective portions of the mirror assemblies 22 and 24, for instance, is greater than 180°. In other words, the V-shaped configuration formed by the mirror assemblies 22b and 24b is inverted relative to the V-shaped configuration formed by the mirrors 22 and 24 or the mirrors 22a and 24a. Consequently, the mirror assembly 22b provides the vehicle operator with a line of sight 18b to the left rear of the vehicle, indicated by the broken line 12b, and the mirror assembly 24b provides a line of sight 16b to the right rear of the vehicle 12b.

In this form, the mirror assemblies 22b and 24b are connected to the turn signal system so that the right mirror assembly 22b becomes operative to reflect images from the left rear of the vehicle when the left turn signal 70 is activated and the left rear mirror assembly 24b becomes operative to reflect images from the right rear of the vehicle when the right turn signal 74 is activated. In practice, this right mirror assembly 22a is connected through the appropriate control circuit to the line 78 (FIG. 6) and the left mirror assembly 24b is connected to the line 80.

In another embodiment of the reflecting means, as shown in FIG. 13, a rear view mirror assembly 210 is provided comprising a normally centered rear view mirror 220, an angled left liquid crystal mirror assembly 222, and an angled right liquid crystal mirror assembly 224 located in a close side-by-side relationship with the assembly 222. The mirror 220 and the mirror assemblies 222 and 224 are permanently affixed on the housing 226 so that they are not adjustable relative to each other. The mirror 220 and the mirror assemblies 222 and 224 are all, however, movable relative to the vehicle since the housing 226 is adjustably mounted on the vehicle. In this embodiment, as in the embodiment shown in FIG. 12, the left angled mirror assembly 222 provides the driver with a view to the right rear side of the vehicle and the right angled mirror 224 provides the driver with a view to the left rear side of the vehicle. Once the optimum angle between the angled side-by-side mirror assemblies 222 and 224 is determined, any adjustment of the housing 226 for the particular driver will not appreciably affect the fields of view to either the right or left rear sides of the vehicle.

Another embodiment of the reflecting means is shown in FIG. 16 wherein a conventional rear view mirror 320 is mounted on the vehicle by means of a mounting bracket 321. Left and right angled liquid crystal mirror assemblies 322 and 324 are mounted in a side-by-side relationship on a housing 323 which is in turn mounted on the vehicle by a support bracket 325 so that the rear view mirror 320 can be adjusted independently of the housing 323. The support bracket 325 can, if desired, be connected directly to the rear view mirror bracket 321 or it can be connected directly to the windshield or windshield frame. The housing 323 on which the mirror assemblies 322 and 324 are fixedly mounted can itself be permanently affixed or adjustably mounted on the vehicle. The angular positioning of the mirror assemblies 322 and 324 relative to each other corresponds to the positioning of the mirror assemblies 222 and 224 in the embodiment shown in FIG. 13.

Another embodiment of the reflecting means is shown in FIGS. 14 and 15 where a conventional rear view mirror 420 is mounted on the vehicle at a normally centered location. The liquid crystal mirror assemblies in this embodiment are horizontally spaced apart from each other on either side of the rear view mirror 420. The left mirror assembly 422 is mounted on the vehicle near the upper left portion of the windshield 423 while the right mirror assembly 424 is mounted on the vehicle near the upper right hand portion of the windshield 423. The mirror assemblies 422 and 424 can either be permanently secured in place or they can be adjustably mounted by ball and socket means 425, for example, on the windshield frame. As seen in FIG. 15, the left mirror assembly 422 reflects images from the right rear of the vehicle while the right mirror assembly 424 reflects images from the left rear of the vehicle. It can be readily appreciated that the mirror assemblies 422 and 424 can be mounted in a variety of ways. It is envisioned, for instance, that the mirror assemblies 422 and 424 can be inset into the border frame that surrounds the windshield to give the appearance of an integral construction. The spaced apart positioning of mirror assemblies 422 and 424 is beneficial in minimizing the structure at the center of the windshield while still providing the driver with extended views of the areas to the right and left rear of the vehicle.

In the embodiments described with reference to FIGS. 13-16 as well as the other embodiments, the liquid crystal mirror assemblies are activated when the turn signal system is turned on. Liquid crystal mirror assemblies which scatter the light rays or liquid crystal mirror assemblies which rotate the light rays can be employed in any of the disclosed embodiments with the term "diffusing" being applicable to either the rotation or scattering of the light rays.

It can be seen from the above description that an improved rear view mirror system is provided whereby the operator can selectively activate left and right hand mirrors to reflect images from the right and left rear sides of the vehicle while maintaining a continuous line of sight to the rear of the vehicle. During normal forward movement of the vehicle, the left and right hand mirror assemblies remain inoperative precluding annoying distractions to the vehicle operator.

What is claimed is:

1. Rear view mirror apparatus for use in a motor vehicle comprising reflecting means, means for movably mounting said reflecting means to said vehicle, one portion of said reflecting means being positioned at an angle with respect to another portion of said reflecting means and being in a position to enlarge the area of vision to the right rear of the vehicle, said other portion of said reflecting means being in a position to enlarge the area of vision to the left rear of the vehicle, a voltage source, a single thickness of liquid crystal solution covering each of said portions, said solution being substantially opaque when a voltage is applied thereto and transparent in the absence of said voltage, circuit means connecting said voltage source to said solution covering each of said portions thereby providing for the nonreflectivity of said portions, and means operatively associated with said circuit means and operable to provide for the removal of the voltage from the solution covering a selected one of said portions to enable said selected portion to become reflective while the nonreflectivity of said other portion is maintained.

2. Rear view mirror apparatus for use in a motor vehicle and in combination with a turn signal system for said vehicle, said turn signal system including right and left turn signals, said apparatus comprising reflecting means, means for movably mounting said reflecting means to said vehicle, one portion of said reflecting means being positioned at an angle with respect to another portion of said reflecting means and being in a position to enlarge the area of vision to the right rear of the vehicle, said other portion of said reflecting means being in a position to enlarge the area of vision to the left rear of the vehicle, means operable to obstruct the reflecting of images from said portions by diffusing incident light radiation to and from said portions, means connecting said obstructing means with said turn signal system whereby activation of said right signal renders said one portion operative to reflect images from said right rear area of said vehicle and activation of said left signal renders said other portion operative to reflect images from said left rear area of said vehicle.

3. The rear view mirror apparatus according to claim 2 wherein said means operable to obstruct the reflecting of images from said portions comprises a pair of liquid crystal units, each of said units including a transparent member having an exposed surface, one of said units positioned in a covering relation over one of said portions and the other of said units positioned in a covering relation over said other portion, each of said units being positioned relative to its associated portion to define a predetermined angle between said exposed surface and said associated portion, whereby said exposed surface will reflect images from a selected direction.

4. The rear view mirror apparatus according to claim 3 wherein said exposed surface is angled to face in a generally upwardly direction.

5. The rear view mirror apparatus according to claim 4 wherein the angle in radious between said exposed surface of said transparent member and said associated portion is no greater than the index of refraction of said transparent member.

6. Rear view mirror apparatus for use in a motor vehicle comprising reflecting means mounted on said vehicle, one portion of said reflecting means being positioned at an angle with respect to another portion of said reflecting means and being in a position to enlarge the area of vision to the right rear of the vehicle, said other portion of said reflecting means being in a position to enlarge the area of vision to the left rear of the vehicle, a voltage source, liquid crystal solution covering each of said portions, means separating the liquid crystal solution covering one portion from the liquid crystal solution covering the other portion, circuit means connecting said voltage source to each of said liquid crystal solutions covering each of said portions, and control means operatively associated with said circuit means to provide for the selective application of a voltage to each of said liquid crystal solutions, said control means being operable to render one selected portion reflective while maintaining the nonreflectivity of the other portion and being operable to maintain simultaneously the nonreflectivity of both of said portions.

7. Rear view mirror apparatus according to claim 6 wherein said liquid crystal solution provides for the reflectivity of associated portion in response to operation of said control means providing for the application of a voltage to said liquid crystal solution.

8. Rear view mirror apparatus according to claim 6 wherein said liquid crystal solution provides for the reflectivity of its associated portion in response to operation of said control means preventing the application of a voltage to said liquid crystal solution.

9. Rear view mirror apparatus according to claim 6 further including a pair of transparent members, one transparent member being positioned in a covering relation over one of said portions and the other transparent member being positioned in a covering relation over the other of said portions, said liquid crystal solution being disposed between an associated transparent member and reflective portion, each of said transparent members having a generally flat exposed surface, said exposed surface being positioned at a selected angle with respect to its associated reflective portion whereby said exposed surface will reflect images from a selected direction.

10. Rear view mirror apparatus according to claim 9 wherein said exposed surface of each transparent member is angled to face in a generally upwardly direction.

11. Rear view mirror apparatus according to claim 10 wherein the angle in radious between said exposed surface and said associated portion is no greater than the index of refraction of said transparent member.

12. Rear view mirror apparatus according to claim 6 wherein said reflecting means comprises a left mirror assembly and a right mirror assembly, each of said mirror assemblies having a mirror surface and liquid crystal solution covering said mirror surface, said mirror assemblies being mounted on said vehicle in horizontally spaced apart locations, said mirror assemblies being arranged so that said right mirror assembly reflects images from the left rear side of the vehicle and the left mirror assembly reflects images from the right rear side of the vehicle.

13. Rear view mirror apparatus according to claim 6 wherein said reflecting means comprises a housing structure adjustably mounted on said vehicle, a rear view mirror and left and right mirror assemblies mounted on said housing structure, each of said mirror assemblies including a mirror surface and liquid crystal solution covering said mirror surface, said mirror assemblies being angled with respect to each other to enlarge the areas of vision to the left and right rear sides of the vehicle.

14. Rear view mirror apparatus according to claim 13 wherein said right mirror assembly is angled to reflect images from the left rear side of the vehicle and said left mirror assembly is angled to reflect images from the right rear side of the vehicle.

15. Rear view mirror apparatus according to claim 13 wherein said right mirror assembly is angled to reflect images from the right rear side of the vehicle, and said left mirror assembly is angled to reflect images from the left rear side of the vehicle.

16. Reflecting apparatus according to claim 6 wherein said reflecting means comprises a housing, left and right mirror assemblies, means mounting said mirror assemblies on said housing in a side-by-side relationship, each of said mirror assemblies having a mirror surface and liquid crystal solution covering said mirror surface, said mirror assemblies being angled with respect to each other so that one mirror assembly is operable to reflect images from the left rear side of the vehicle and the other mirror assembly is operable to reflect images from the right rear side of the vehicle.

* * * * *